United States Patent [19]

Toyomura

[11] 4,029,183

[45] June 14, 1977

[54] CONTROL VALVE FOR STEERING CLUTCH AND BRAKE

[75] Inventor: Akihiro Toyomura, Hirakata, Japan

[73] Assignee: Kabushiki Kaisha Komatsu Seisakusho, Tokyo, Japan

[22] Filed: Feb. 23, 1976

[21] Appl. No.: 660,370

Related U.S. Application Data

[63] Continuation of Ser. No. 481,476, June 20, 1974, abandoned.

[30] Foreign Application Priority Data

June 20, 1973 Japan .............................. 48-72206

[52] U.S. Cl. ........................ 192/13 R; 188/106 F; 137/625.27
[51] Int. Cl.² ...................................... F16D 67/04
[58] Field of Search .............. 192/13 R, 12 C, 4 A, 192/4 C

[56] References Cited

UNITED STATES PATENTS

| | | | |
|---|---|---|---|
| 2,941,639 | 6/1960 | Christenson et al. ............ | 192/13 R |
| 3,080,026 | 3/1963 | Koch .............................. | 192/13 R |
| 3,374,846 | 3/1968 | Massone ......................... | 192/13 R |
| 3,595,352 | 7/1971 | Todeschini ...................... | 192/12 C |
| 3,841,450 | 10/1974 | Drone et al. .................... | 192/4 C |

FOREIGN PATENTS OR APPLICATIONS 2,116,311  10/1972  Germany .......................... 192/13 R

*Primary Examiner*—Benjamin W. Wyche
*Attorney, Agent, or Firm*—Armstrong, Nikaido & Marmelstein

[57] ABSTRACT

A control valve for a hydraulically actuated steering clutch and steering brake are provided. The valve comprises a valve housing having a plurality of bores therein, right and left hand operating rods and first, second and third spools slidably disposed within said respective bores. The spools are normally urged towards a neutral position where the hydraulic fluid from a hydraulic pressure supply source is discharged, through a drain circuit. The first and third spools are arranged such that when either of the right and left hand operating rods is moved on a predetermined stroke, the hydraulic fluid delivered by the supply source is supplied into either the pressure chamber of a right hand steering clutch or that of a left hand steering clutch, and when the operating rod is moved on a further predetermined stroke, the hydraulic fluid is supplied into either the pressure chamber of a right hand steering brake or that of a left hand steering brake, whereby the steering clutch and the steering brake can be controlled by a common control valve.

2 Claims, 3 Drawing Figures

CONTROL VALVE FOR STEERING CLUTCH AND BRAKE

BACKGROUND OF THE INVENTION

This invention relates to a steering clutch and brake for controlling the travelling of a tractor such as bulldozer, and more particularly to a control valve for a hydraulically actuated steering clutch and brake.

Conventional control valves for a steering clutch and brake of this type are either actuated by independent operating rods, respectively or actuated in interlocked relationship by a common operating rod, but in either case, the steering clutch and the steering brake are actuated by means of respective control valves.

Therefore, the conventional control device is disadvantageous in that a separate operating rod is required for each of the steering clutch and the steering brake so that the entire structure becomes complicated, and the respective operating rods have to be adjusted in length in such a manner that after the steering clutch is released, the steering brake is controlled.

SUMMARY OF THE INVENTION

It is, therefore, an object of the present invention to provide a control valve which can be commonly used for controlling a hydraulically actuated steering clutch and steering brake.

BRIEF DESCRIPTION OF THE DRAWINGS

The above and other objects, features and advantages of the control valve for a hydraulically actuated steering clutch and steering brake according to the present invention will become fully apparent from the following description taken in conjunction with the accompanying drawings, in which:

Further FIG. 1 is a view showing a condition wherein the right and left steering brakes 101R and 101L are not operated and, at the same time, the right and left steering clutches 32R and 32L are engaged so as to permit forward drive on the vehicle because no operating rod or pedal is actuated, while FIG. 2 is a view showing a condition wherein the right operating rod 23R is actuated so as to disengage the right steering clutch 32R and exert an ordinary braking force on the right steering brake 101R for the purpose of turning the vehicle to the right.

Figure 1:
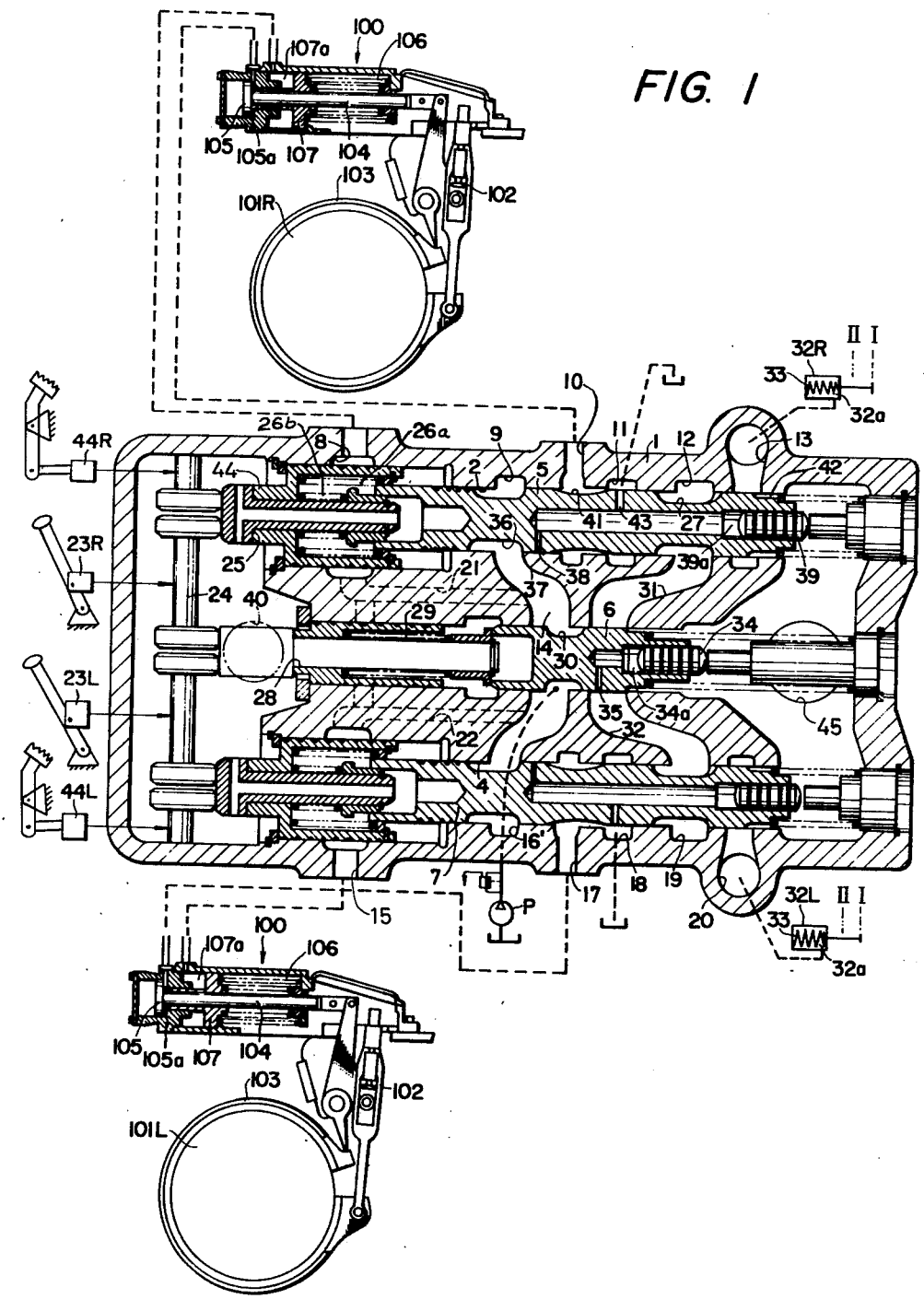
FIG. 1 is a sectional view of one embodiment of the control valve of the present invention.
Figure 2:
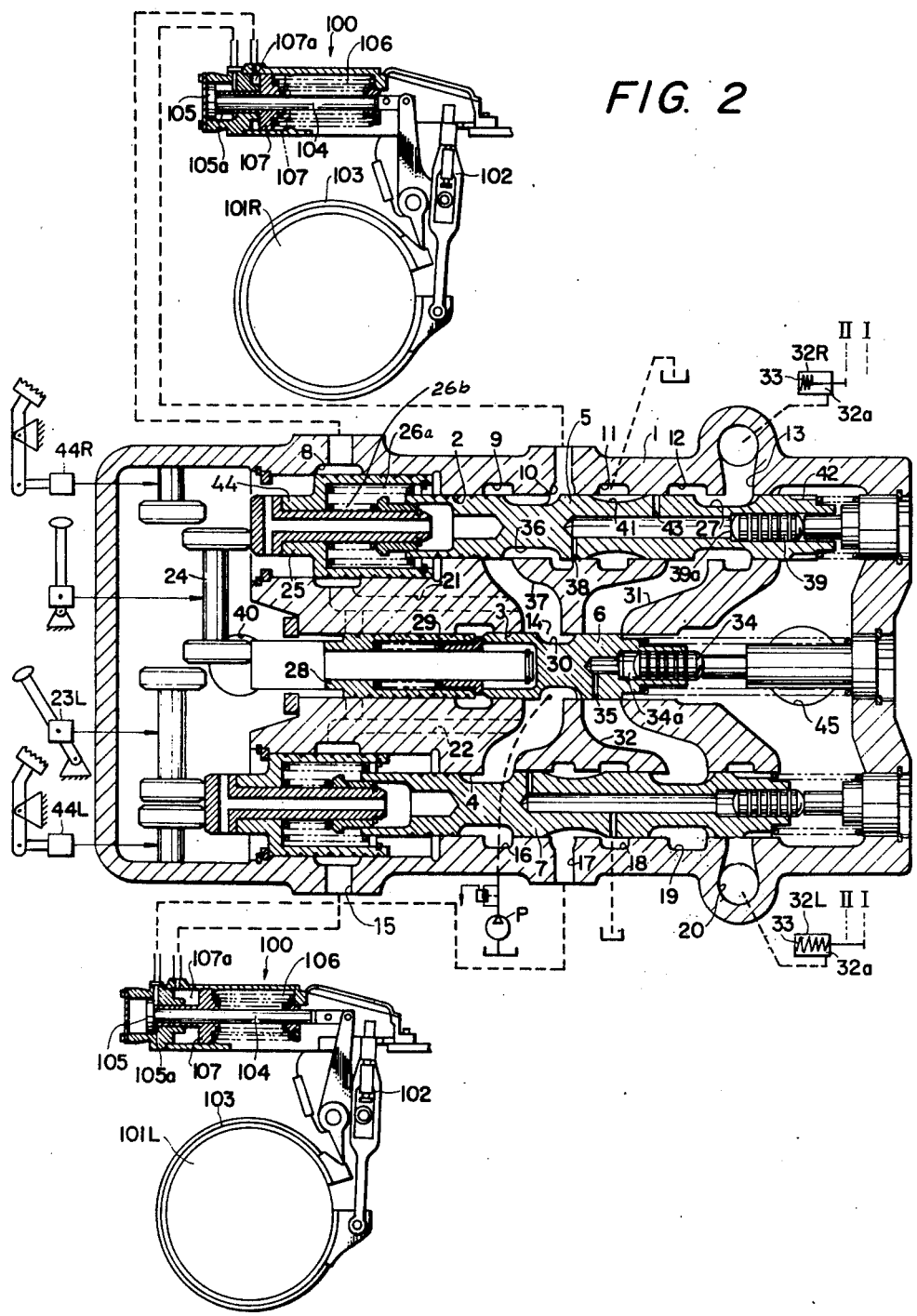
FIG. 2 is a view for explaining the operation of the control valve of the present invention.

The "neutral position" of the first and second spools described in the present claim means the state illustrated by FIG. 1.

DESCRIPTION OF THE PREFERRED EMBODIMENT

In the drawing, reference numeral 1 indicates a valve housing which has formed therein first, second and third bores 2, 3 and 4. Within the first, second and third bores 2, 3 and 4 are slidably disposed first, second and third spools 5, 6 and 7.

First to sixth ports 8 to 13 are formed in the first bore 2, and seventh port 14 is formed in the second bore 3. Eighth to thirteenth ports 15 to 20 are formed in the third bore 4.

The operative relationship between the ports and the spools and also the detailed structure thereof will now be described below together with their operations.

I. Neutral state

The hydraulic fluid discharged from a hydraulic pressure supply source P flows through the seventh port 14, passages 21 and 22 and first and eight ports 8 and 15 into pressure receiving chamber 107a for the emergency brake defined within the right and left brake actuating cylinders 100. Each of the right and left brake operated cylinders 100 contains a first piston 105 having a piston rod 104 connected through a linkage 102 to a brake band 103 of each of the right and left steering brakes 101, and a second piston 107 having slidably fitted on the piston rod 104 and being urged by a spring 106 toward the first piston 105. When hydraulic fluid is supplied to the pressure receiving chamber 105a for the ordinary brake of the first piston 105 or hydraulic fluid in the pressure receiving chamber 107a for the emergency brake of the second piston 107 is discharged, the brake band 103 is actuated, and when hydraulic fluid in the pressure receiving chamber 105a for the ordinary brake is discharged or hydraulic fluid is supplied to the pressure receiving chamber 107a for the emergency brake, the brake band 103 is released. Therefore, both the right and left steering brakes 101 are released in a neutral state.

II. When the right hand operating rod 23R is gradually operated

The actuating member 24 urges a first push rod 25 to the right in the drawing thereby to move the first spool 5 towards the right through the action of the spring 26 so that the fifth port 12 is connected with the sixth port 13 through a reduced diameter portion 27, while the second spool 6 is moved to the right in the drawing through the second push rod 28 and spring 29 so that the seventh port 14 is connected with the fifth and twelfth ports 12 and 19 through the reduced diameter portion 30 and passages 31 and 32. Therefore, the hydraulic fluid discharged from the hydraulic pressure supply source P flows through the seventh port 14, the reduced diameter portion 30, the passage 31, the fifth port 12, the reduced diameter portion 27 and the sixth port 13 into the pressure chamber 32a of the right steering clutch 32R so that the right side steering clutch 32R is moved against the force of the spring 33 in the direction as shown by II In which the power transmission is interrupted.

Then the pressure chamber 34a defined by a load piston 34 of the second spool 6 is connected through the aperture 35 with the passages 31 and 32. Therefore, if the pressure in the pressure chamber 32a of the clutch is increased, the pressure in the pressure chamber 34a of the load piston 34 is also increased so that the second piston 6 is moved to the left in the drawing against the action of the spring 29 so as to interrupt the communication between the seventh port 14 and the passage 31. Then, when the spring load by the operation of the second push rod 28 is balanced with the urging force of the load piston 34, the second spool 6 interrupts the communication between the seventh port 14 and the passage 31. When the right hand operating rod 23R is moved further to the right thereby to operate the second push rod 28, then the load of the spring 29 is increased, and consequently the second spool 6 is moved towards the right in the drawing so that the seventh port 14 is allowed to communicate with the passage 31 thereby increasing the pressure in the pressure chamber 32a of the right hand steering clutch 32.

Figure 3:
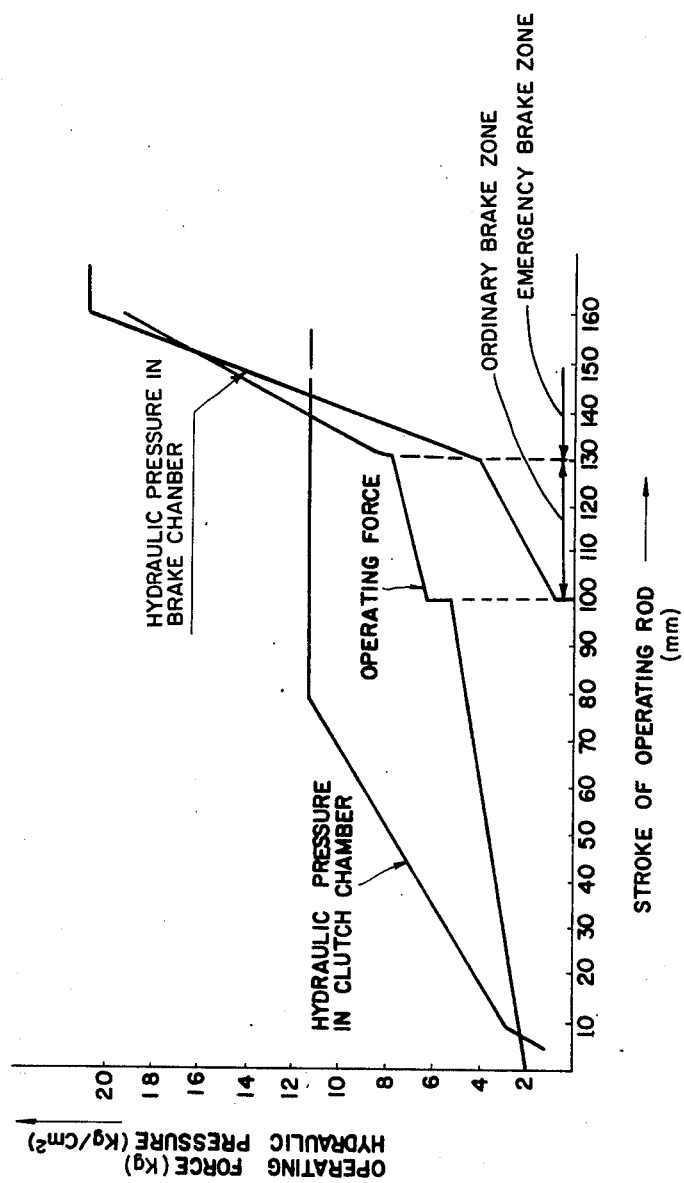
FIG. 3 is a graph showing the relation between the stroke of the operating rod and the hydraulic pressure of the control valve.

In other words, the pressure in the pressure chamber 32a of the right hand steering clutch 32R is increased in proportion to the stroke of the right hand operating rod 23R as shown in FIG. 3.

When the right hand operating rod 23R is further operated, the first spool 5 is further urged to the right so that the second port 9 is connected through the reduced diameter portion 36 with the third port 10, and consequently the hydraulic fluid delivered by the hydraulic pressure supply source P flows through the seventh port 14, the passage 37, the second port 9 and the third port 10 into the pressure receiving chamber 105a for the ordinary brake of the brake cylinder 100. When the hydraulic pressure in the pressure receiving chamber 105a for the ordinary brake is increased, the hydraulic fluid flows through the aperture 38 into the pressure chamber 39a of the loadpiston 39 so as to urge the first spool 5 to the left in the drawing against the repulsion force of the spring 26, thereby to shut off the communication between the second port 9 and the third port 10 at a position where the hydraulic pressure in the pressure receiving chamber 105a for the ordinary brake is balanced with the repulsion force of the spring 26.

When the right hand operating rod 23R is moved further to the right in the drawing, the repulsion force of the spring 26 is increased so that the hydraulic pressure in the pressure receiving chamber 105a for the ordinary brake is increased. Consequently, the first piston 105 is moved to the left in the drawing so that the right hand steering brake 101R is actuated by the brake band 103. In other words, the hydraulic pressure in the pressure receiving chamber 105a for the ordinary brake of the brake cylinder 100 is increased in response to the stroke of the operating rod as shown in FIG. 3.

III. When a right hand brake operating rod 44R is operated, the first push rod 25 is moved to the right in the drawing against the repulsion force of the spring 26. However, since the communication between the seventh port 14 and the passage 31 is not allowed because the second push rod 28 is not moved, the hydraulic pressure in the pressure chamber 32a of the clutch is not increased. Therefore, the hydraulic pressure in the pressure receiving chamber 105a for the ordinary brake of the brake cylinder 100 is increased in response to the stroke of the operating rod 44R in such a state that the clutch is held in contact. Further, when the right hand brake operating rod 44R is operated to its stroke end, the first port 8 and the passage 21 are allowed to communicate with the drain 40 through the reduced diameter portion 44 of the first push rod 25. Therefore, the hydraulic fluid within the pressure receiving chamber 107a for the emergency brake of the brake cylinder 100 flows instantaneously out to the drain so that the second piston 107 is moved to the left in the drawing by the repulsion force of the spring 106 and the first piston 105 is also moved to the left, thereby actuating the right hand steering brake 101R by the brake band 103. In other words, emergency braking is effected.

In this case, there is provided an arrangement in which the right hand operating rod 23R is held up with a stopper before the communication between the reduced diameter portion 44 of the first push rod 25 and the first port 8 is allowed.

IV. When the right hand operating rod 23R returns from the stroke end.

The third port 10 is connected through the reduced diameter portion 41 and the fourth port 11 with the drain so as to discharge the hydraulic fluid within the first pressure receiving chamber 105a for the ordinary brake through the drain. As a result, the first piston 105 is returned rightwards in the drawing so that the brake band 103 is disengaged to release the right hand steering brake 101R.

When the right hand operating rod 23R is returned further, the sixth port 13 is allowed to communicate through the groove 42 formed on the peripheral surface of the one side end of the first spool 5 with the drain 45 and consequently the hydraulic fluid within the pressure chamber 32a of the right hand steering clutch 32R is drained so that the clutch is moved to the power transmission position I by the repulsion force of the spring 33.

Then the hydraulic fluid within the pressure chamber 39a of the load piston 39 is drained through the drain aperture 43 and the drain port 12.

The operation of the control valve when the left hand operating rod 23L is operated is similar to that as described in the above paragraphs (II) to (IV), and accordingly it is omitted.

It will be understood from the foregoing description that since the control valve of this invention is thus constructed, either of the right and left operating rods 101R and 101L and either one of the steering clutches 32R and 32L can be operated.

It will also be understood that the steering brake and steering clutch can be controlled by means of a single control valve, and only one rod for connecting the operating rod 23 with the control valve may be provided at the right and left sides, respectively. Thus, the structure becomes simple and it is not necessary to adjust the length of operating rod for controlling the timing of actuation of the steering brake and steering clutch.

With further reference to FIG. 3, hydraulic pressure in the clutch chamber 32a becomes a constant pressure equal to the hydraulic pressure supplied from the hydraulic pressure supply source P when the operating rod 23R or 23L is moved in a predetermined stroke (80mm) because, at that time, the second spool 6 is directly urged by the operating rod 23R or 23L without interposing the spring 29 therebetween. On the other hand, until the operating rod 23R or 23L takes the predetermined stroke, the hydraulic pressure in the clutch chamber 32a is increased in proportion to the stroke of the operating rod while the clutch 32R or 32L is in a semi-engaging state which is one of the characteristic features of the present invention.

As to hydraulic pressure in the ordinary steering brake chamber 105, this is controlled by the operation of the first spool 5 and depends on the resilient force of the spring 26a. And, since the ordinary steering brake, according to the valve apparatus of the present invention, is applied after the steering clutch is disengaged, steering such brake is applied by the operating rod 23R or 23L after the operating rod 23R or 23L increases beyond the aforesaid predetermined stroke. Further, it is a characteristic feature of the steering brake function of the present invention that the ordinary steering brake is distinguished from the emergency steering brake by the difference of the resilient force between the springs 26a and 26b; that is, in order to apply the emergency steering brake, it is necessary to apply a large operating force to the operating rod 23R or 23L as compared with the application of the ordinary steering brake. By the above function, an operator of the vehicle can determine the distinction between the ordinary steering brake and the emergency one during operation.

It is further necessary to increase the operating force of the operating rod 23R or 23L in proportion to the increase of hydraulic pressure in the clutch chamber 32a, the pressure receiving chamber 105a for the ordinary brake and the pressure receiving chamber 107a for the emergency brake because each of the first, second and third spools 5, 6 and 7 acts as a pressure reducing valve.

What is claimed is:

1. A control valve for a hydraulically actuated steering clutches and steering brakes, comprising a valve housing having a plurality of bores therein; first, second and third spools slidably disposed within said respective bores; right and left hand operating rods operatively connected to said first and third spools respectively, and both rods mechanically connected to said second spool; means for disengaging either one of the steering clutches by supplying hydraulic fluid by two of said spools into a pressure chamber thereof when either one of the right and left operating rods is moved along a predetermined stroke to operate said second spool and one of said first and third spools; and means for applying either one of the steering brakes by supplying hydraulic fluid by one of said first and third spools into a pressure receiving chamber for the brake thereof when said operating rod is further moved along a second predetermined stroke to further operate said one of said first or third spools.

2. A control valve for hydraulically actuated steering clutches and steering brakes as defined in claim 1 further comprising right and left hand brake operating rods operatively connected to said first and third spools respectively; and means for applying one of the steering brakes by supplying hydraulic fluid into a pressure receiving chamber for the brake thereof when said one of the brake operating rods is actuated while maintaining the engagement of the clutches.

* * * * *